INVENTORS:
MILTON L. NOBLE,
JOHN D. STONE,
BY Maurice L. Goldenberg
THEIR ATTORNEY.

INVENTORS:
MILTON L. NOBLE,
JOHN D. STONE,
BY Marvin Goldenberg
THEIR ATTORNEY.

United States Patent Office 3,583,868

Patented June 8, 1971

3,583,868

PROCESS FOR IN-AIR RECORDING ON DIELECTRIC MEDIUM WITH GREY SCALE

Milton L. Noble, Liverpool, and John D. Stone, Phoenix, N.Y., assignors to General Electric Company Filed Apr. 18, 1967, Ser. No. 631,789
Int. Cl. G03g *13/18*
U.S. Cl. 96—1 4 Claims

ABSTRACT OF THE DISCLOSURE

An in-air recording process in which a light image is recorded on a dielectric medium in the form of a periodically sampled charge pattern, the sampling providing grey scale in the output, wherein separate steps are employed for forming an unsampled image charge pattern and a sampling charge pattern, the image and sampling patterns being superimposed one upon the other. In forming the image charge pattern a photoconductor member exposed to said light image is positioned in proximity with the recording medium and a transfer voltage applied. In forming the sampling charge pattern a sampling structure is placed in proximity with the recording medium and a transfer voltage applied. As a final step in the process, the composite charge pattern is developed to provide a viewable image.

BACKGROUND OF THE INVENTION

(1) Field of the invention

The invention relates in general to the field of in-air recording wherein by photoconductive means a light image is recorded on a dielectric medium in the form of a corresponding latent charge, which medium may then be developed so as to provide a visible image either by projection or copying procedures.

(2) Description of the prior art

With respect to in-air recording devices of the type under consideration, it is desirable to sample, or dissect, the charge pattern applied to the dielectric medium for providing a low spatial frequency response as well as grey scale definition in the readout information. In accordance with well known sampling theory, the sampling frequency must be at least twice that of the highest recorded information frequency component. Sampling is conventionally performed simultaneous with the image formation. One common method is optical sampling wherein a grating structure is inserted in the path of the light image which illuminates the photoconductive means. A principal disadvantage of a simultaneous sampling process is that it is subject to bandwidth limitations the same as or similar to those inherent in the image recording process per se. The result is an appreciable degradation in bandwidth of the recorded information.

The referred to bandwidth limitation of the recorded information may be explained by considering the spatial frequency response of this recording process, the response being manifested in the ratio of deposited charge for illuminated areas to deposited charge for unilluminated areas. This ratio is found to be inversely proportional to resolution at the upper end of the resolution scale, due principally to imperfections in the charge transfer process. The spatial frequency response may be represented by a curve which is approximately flat to a spatial frequency on the order of 20 lines per mm., at which point a simple break occurs and the curve falls off. In order to preserve full bandwidth for the recorded image information, it may be appreciated that a capability must exist for providing a sampling frequency appreciably greater than that of the highest information frequency, in the example given at least 40 lines per mm. Prior art sampling methods are not known to satisfactorily provide such capability so that a considerable portion of the recorded image information may be lost.

SUMMARY OF THE INVENTION

It is accordingly an object of the invention to provide a novel in-air recording process for recording light information on a dielectric medium with grey scale wherein full bandwidth for the recorded image information is preserved.

Another object of the invention is to provide a novel in-air recording process as above described wherein a resolvable sampling frequency can be obtained that is appreciably greater than the highest recorded information frequency component.

It is another object of the invention to provide a novel in-air recording process as described wherein the sampling and imaging functions with respect to formation of charge on the recording surface may be independently and optimumly controlled.

It is still another object of the invention to provide a novel in-air recording process as described wherein a uniform sampling of the entire recording surface is readily provided.

It is a further object of the invention to provide a novel in-air recording process as described for recording on a deformable recording medium which process allows the use of a zero-order Schlieren optics projection system.

In accordance with one specific embodiment of the invention satisfying these and other objects, a photoconductor is brought into close proximity with a dielectric recording medium, separated by a small air gap, and then exposed to a light image to be recorded so as to alter the photoconductor elemental resistivity as a function of the light. A transfer voltage is next applied between the photoconductor and the recording medium for depositing charge on the surface of the recording medium facing the photoconductor in the form of a charge pattern directly corresponding to said light image. As a next step in the process the photoconductor and dielectric recording medium are separated and a grating structure brought into close proximity with the recording medium. A second transfer voltage is then applied between the grating structure and the recording medium so as to produce a precise on-off discharge and superimpose charge in the form of a sampling charge pattern on the initially formed image charge pattern. The image charge formation and sampling charge formation can be performed in an optimum manner by suitable adjustments of the transfer voltage levels, light levels, gap spacing, judicious choice of photoconductor characteristics, etc. Accordingly, providing discrete imaging and sampling steps in the manner described maintains the highest possible information bandwidth.

In the present system areas of the composite charge pattern finally formed on the dielectric recording medium which correspond to bright portions of the applied light image have the lowest level charge modulations, and areas corresponding to dark portions of the light image have the highest level charge modulations. Where the dielectric recording medium is deformable in nature, such as when employing a thermoplastic material, the bright areas are deformed least and the dark areas deformed most. Accordingly, a positive image may be projected by means of a zero-order Schlieren optics system wherein undiffracted light is entirely transmitted to the display area and diffracted light is blocked. This has the distinct advantage of masking background noise in the displayed image.

FIGURES OF THE DRAWING

Figure 1A:
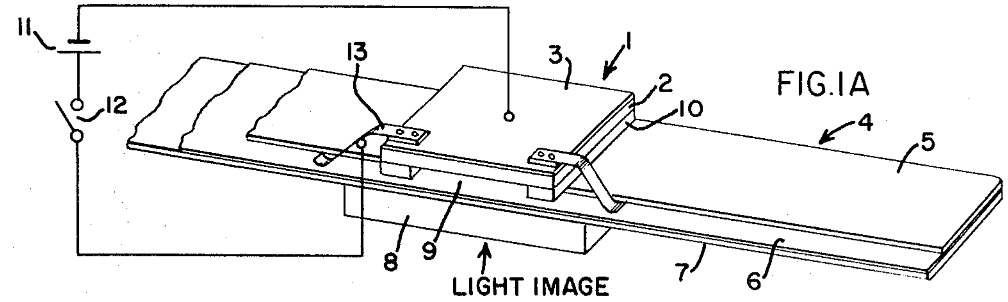
FIGS. 1A and 1B show one embodiment of an in-air recording process in accordance with the present invention.
Figure 1B:
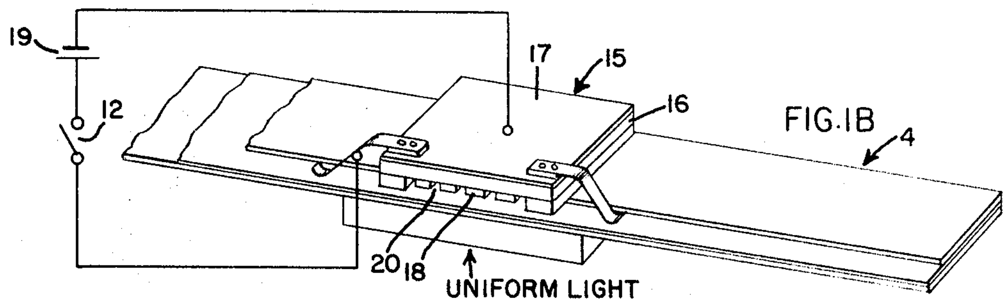

In FIGS. 1A and 1B are illustrated two basic steps of an in-air recording process for forming a sampled electrostatic charge pattern on the surface of a dielectric recording medium, which charge pattern corresponds to an applied light image. The first step of the process is shown in FIG. 1A wherein a photoconductor plate 1, comprising a layer of photoconductive material 2, typically selenium, and a conductive backing electrode 3, is brought into close proximity with a dielectric recording medium 4. In the example being considered, the dielectric recording medium is a thermoplastic film and includes a layer of thermoplastic material 5, an intermediate transparent conductive coating 6 and a transparent Mylar base layer 7. The thermoplastic film is shown supported by a transparent support member 8, such as glass. It may be readily recognized that other dielectric material can be employed as the recording medium in the process to be described, e.g., that used in xerographic work. A small air gap 9 exists between the photoconductive material 2 and the thermoplastic material 5, maintained by a pair of Mylar shims 10. A transfer voltage, provided in exemplary fashion by a battery 11, is applied by means of a switch 12 across the photoconductor and thermoplastic layers 2 and 5 and the air gap 9, the voltage being directly connected to conducting electrodes 3 and 6. The negative terminal of battery 11 is connected to conductor 3, and the positive terminal thereof is connected through switch 12 to conductor 6 by means of a sliding contact 13 mechanically attached through an insulating pad to the photoconductor plate 1. The photoconductor plate may be forceably urged toward the thermoplastic film for ensuring good electrical contact at the conducting layer 6.

In a typical sequence of operations, following positioning of the photoconductive plate and thermoplastic film, a light image is directed to the photoconductor through the thermoplastic film. The switch 12 is then closed to apply the transfer voltage. This causes a discharge across the gap 9 forming a charge pattern on the surface of the recording medium which corresponds element for element to the applied light image. Next, the voltage is disconnected by opening the switch 12, followed by removal of the light image. The sequence of the operations thus far described is not actually critical and the light image may be applied and removed in synchronism with the transfer voltage. However, it is desirable that the transfer voltage not be applied for an excessive length of time, i.e., which will result in degradation of the deposited charge pattern due to excessive charge being deposited in unexposed areas. A time on the order of one second is typical.

The charge pattern formed on the surface of the recording medium to this point in the operation cannot provide grey scale definition in the readout. As is well known, without a sampling of the recorded image only the boundaries between extensive black and white areas can be detected in the readout image.

In FIG. 1B the second step of the process is illustrated wherein a sampling pattern is superimposed upon the initially formed image charge pattern. A photoconductor plate 15 is employed similar to plate 1, including a layer of photoconductive material 16 and a conductive backing layer 17. In addition, deposited on the surface of the photoconductive layer is a grating structure 18 of dielectric material. One dielectric material that has been found to be satisfactory for this purpose is KPR which can be readily deposited on the surface of a selenium photoconductor with a thickness of several microns. The configuration of the grating may take a number of different forms, the essential function being to ultimately provide a periodic spatial modulation or sampling of the initially applied charge image. Thus, the grating structure may be in the form of closely spaced parallel or nonparallel lines, a cross grid arrangement of intersecting parallel or nonparallel lines, an arrangement of dots, etc.

The photoconductor plate 15 is brought into close proximity with the thermoplastic recording medium 4, as in the first step of FIG. 1A. A transfer voltage is applied across the members 15 and 4 and the intervening air gap 20 by means of a battery 19 and switch 12. A uniform light is applied at approximately the same time the transfer voltage is applied. The transfer voltage causes a discharge across the air gap 20 from the uncovered photoconductor areas, with essentially no discharge from the dielectric covered areas, so as to superimpose upon the charge previously formed a sampling or modulation pattern.

Figure 2:
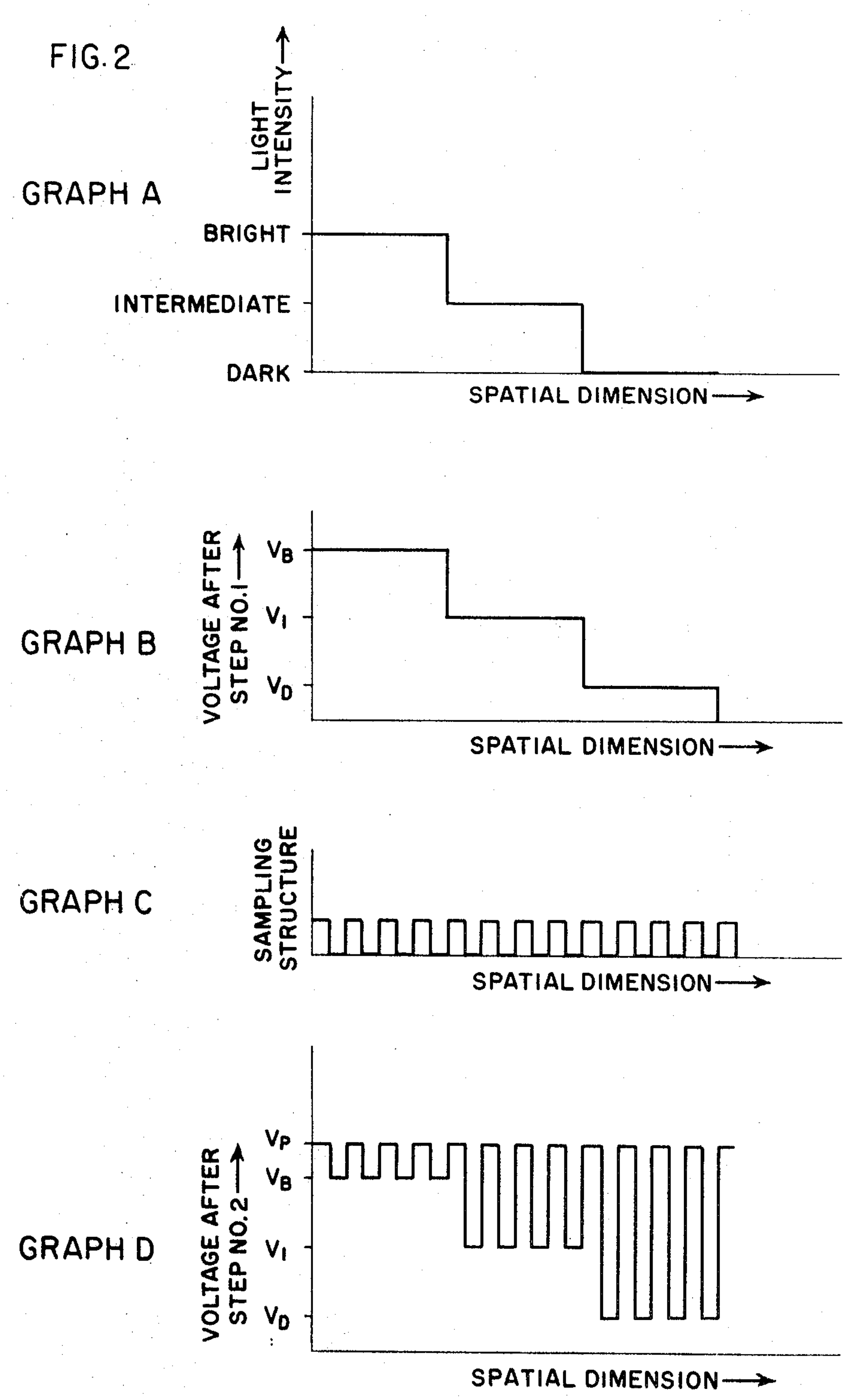
FIG. 2 is a series of graphs employed in a description of the process employed with respect to FIGS. 1A and 1B.

With respect to the operation of the above described two-step recording process, reference will be made to the several graphs shown in FIG. 2. In Graph A there is plotted light intensity of the applied image vs. spatial dimension, presenting several representative light conditions of said applied image; in Graph B there is plotted the voltage distribution across the thermoplastic recording medium corresponding to the light intensity shown in Graph A which will exist after the first imaging step and prior to the second sampling step; Graph C is a plot of the grating structure used in the second step; and in Graph D there is plotted voltage across the thermoplastic medium, and shows the voltage distribution for the various light conditions after the second step is performed.

From Graphs A and B it is seen that after the first step in the process, a maximum voltage denoted as $V_B$ exists for bright areas of the applied image; a minimum voltage denoted as $V_D$ exists for dark areas; and intermediate voltage levels exist for intermediate light levels, only one level being illustrated, denoted as $V_I$. Significantly, the voltage at each elemental portion of the recording medium has a direct correspondence to light intensity of the applied image. As shown in Graph D, application of the second sampling step provides the voltage across the recording medium with a periodic modulation having a frequency determined by the spatial frequency of the grating structure. In the embodiment under consideration, the transfer voltage employed in the second step provides a peak voltage $V_P$ across the thermoplastic medium slightly greater than the maximum voltage $V_B$. The trough voltages correspond to the voltage levels of the first imaging step $V_B$, $V_I$ and $V_D$.

In one operating embodiment of the invention the following circuit parameters and dimensions were employed, these being given for purposes of example and not to be construed as limiting.

Photoconductor layers 2 and 16:
- Selenium 50–100 microns thick
- $10^{14}$ ohm-cm. dark resistivity
- $10^{9}$ ohm-cm. light resistivity Thermoplastic layer 5—7–8 microns thick
Air gap 8—12 microns
Batteries 11 and 19—1000–1400 volts
$V_P$—220 volts
$V_B$—200 volts
$V_D$—20 volts
Spatial frequency grating structure—50 lines per millimeter The principal advantage attributable to the described two step process is its ability to utilize the full bandwidth of the recorded image information. This is accomplished by employing a precise on-off characteristic for the sampling step discharge without adverse effect on the image charge formation. The on-off characteristic results from modifying the air gap field strength on a point to point basis. For example, in the sampling structure shown in FIG. 1B the air gap field strength at the dielectric coated portions is reduced to the point where essentially no current will flow, whereas the field strength at the noncoated portion supports appreciable current flow. Since noise currents are in this manner essentially eliminated, sampling can be introduced with a spatial frequency considerably greater than that of the imaging step.

Further advantage of the current recording process is afforded by the ready ability to optimize the image and sampling charge pattern formations since separate and distinct steps are employed. Thus operating parameters such as the magnitude and duration of the transfer voltage, the dimensions and material compositions of the sandwich structure and the light intensities are selected for best performance appropriate to each step.

An additional advantage is the flexibility provided with respect to the employment of the sampling structure. Thus, the sampling structure need not have a photoconductive characteristic.

Figure 3:
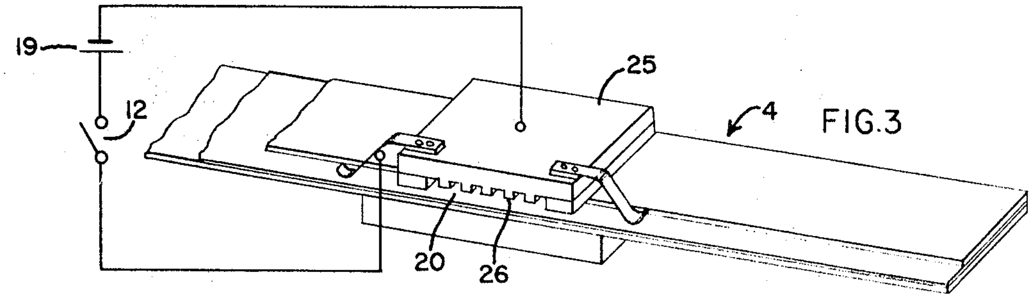
FIG. 3 shows an alternative embodiment of the second step of the process shown with respect to FIGS. 1A and 1B.

In FIG. 3 there is shown an alternative embodiment of the second sampling step wherein the sampling photoconductor plate 15 of FIG. 1B is replaced by a conductor plate 25 having a scored surface 26 which is brought into facing relationship with the recording surface of the dielectric recording medium 4. The scoring may be along parallel lines, intersecting lines, etc. The conductor plate is spaced from the recording medium by an amount which causes the voltage applied by battery 19 to break down the gap and provide a discharge from only the protruding portions of the scored surface. The field strength of the recessed portions is insufficient to cause breakdown. Accordingly, a sampling charge pattern may be formed on the surface of the dielectric recording medium in a similar manner to that previously described with respect to FIG. 1B.

In the exemplary embodiments of the recording process that have been described to this point, the image charge pattern is first formed and the sampling charge pattern superimposed thereon. It should be pointed out, however, that the sequences of steps may be reversed with no substantial change in the total process resulting. Accordingly, essentially the same composite charge pattern as represented in Graph D of FIG. 2 can be expected by first depositing on the recording surface the sampling charge pattern and superimposing thereon the image charge pattern.

Figure 4:
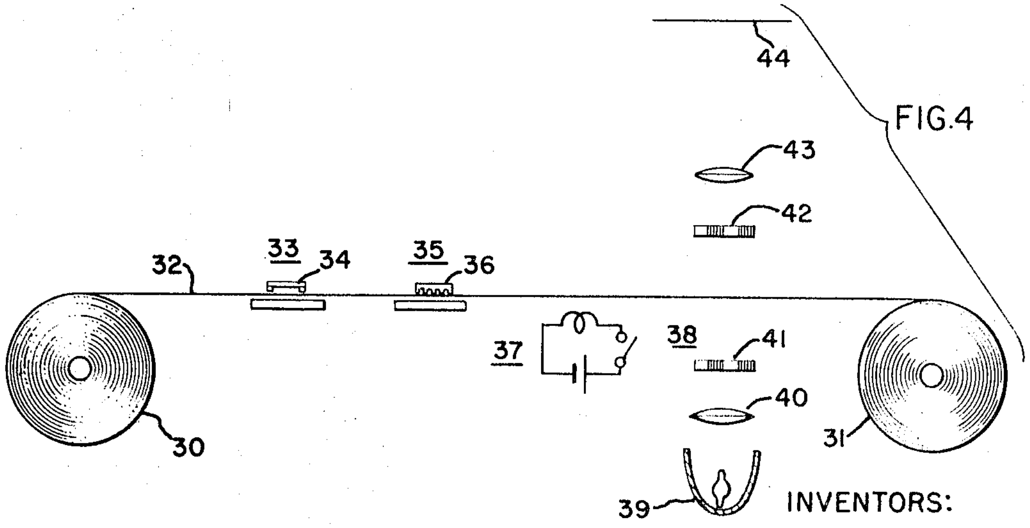
FIG. 4 is a schematic diagram of a complete thermoplastic recording and projection apparatus which incorporates the process of the present invention.

In FIG. 4 there is illustrated a schematic diagram of a complete thermoplastic recording and projection apparatus incorporating the two-step process of the present invention. The apparatus includes a feed drum 30 and a take-up drum 31 which are used to transport and store a thermoplastic film 32. At a first station 33 the first step of the recording process is performed. A photoconductor plate 34, being placed in close proximity with the thermoplastic film, is exposed to an image and a transfer voltage applied for forming an image charge pattern. The film is then transported to a second station 35 where a scored conductor plate 36 is brought into close proximity with the thermoplastic film and a transfer voltage applied so as to superimpose a sampling charge pattern on the image charge pattern. At a third station 37, thermal energy is applied to the charged thermoplastic film so as to deform the surface in accordance with the superimposed charge patterns. Upon removal of the heat the deformations become fixed. At a fourth station 38 a zero order Schlieren optics projection system is provided for reading out the stored image. The Schlieren optics system is of a conventional type and is schematically illustrated to include a light source 39, a condensing lens 40, a pair of bar and slit arrangements 41 and 42, objective lens 43 and a screen 44. As is well known, in a zero order Schlieren system undiffracted light is projected onto the screen and diffracted light is blocked. Accordingly, the portions of the thermoplastic tape corresponding to the bright portions of the applied image diffract the projected light least and appear as bright areas in the display, whereas portions of the thermoplastic tape corresponding to the dark areas of the applied image diffract the projected light most and appear as dark areas in the display.

Although the invention has been described with reference to specific exemplary embodiments for purposes of clear and complete disclosure, the appended claims are intended to include within their meaning all modifications and variations which reasonably fall within the basic teachings herein set forth.

What we claim as new and desire to secure by Letters Patent of the United States is:

1. A method of recording information on a dielectric recording medium, comprising the steps of:

(a) positioning a photoconductor in close proximity with the recording surface of said dielectric recording medium so that a small air gap exists therebetween, (b) exposing said photoconductor to an applied light image, (c) applying a transfer voltage between said photoconductor and said recording medium so as to selectively discharge across said air gap and form on said recording surface an image charge pattern the intensity of which corresponds element for element with said applied light image, (d) positioning a grating structure in close proximity with said recording surface with a second air gap formed therebetween, and (e) applying a second transfer voltage between said grating structure and said recording medium to selectively discharge additional charges across said second air gap on said recording surface in a sampled pattern, the composite charge pattern thus formed being an arrangement of peaks of substantially constant higher level established by said second transfer voltage and of varying trough levels which correspond to the intensity of the image charge pattern.

2. A method as recited in claim 1 wherein said grating structure includes a photoconductor plate, one surface of which has deposited thereon a dielectric grating, and wherein the step of positioning said grating structure includes exposing the grated photoconductor to a uniform light.

3. A method as recited in claim 1 which further comprises the step of developing the composite charge pattern formed on said recording surface.

4. A method as recited in claim 3 wherein said dielectric recording medium is a thermoplastic film and said developing step includes applying thermal energy to said film.

References Cited

UNITED STATES PATENTS

| | | | |
|---|---|---|---|
| 2,598,732 | 6/1952 | Walkup | 96—1 |
| 3,196,012 | 7/1965 | Clark | 96—1.1 |

FOREIGN PATENTS

| | | | |
|---|---|---|---|
| 984,990 | 3/1965 | Great Britain | 96—1 |

DONALD LEVY, Primary Examiner

R. E. MARTIN, Assistant Examiner

U.S. Cl. X.R.

96—1.1